June 6, 1939.  A. E. LINDELOF  2,161,714
PLOW COLTER AND SHOE
Filed June 4, 1938
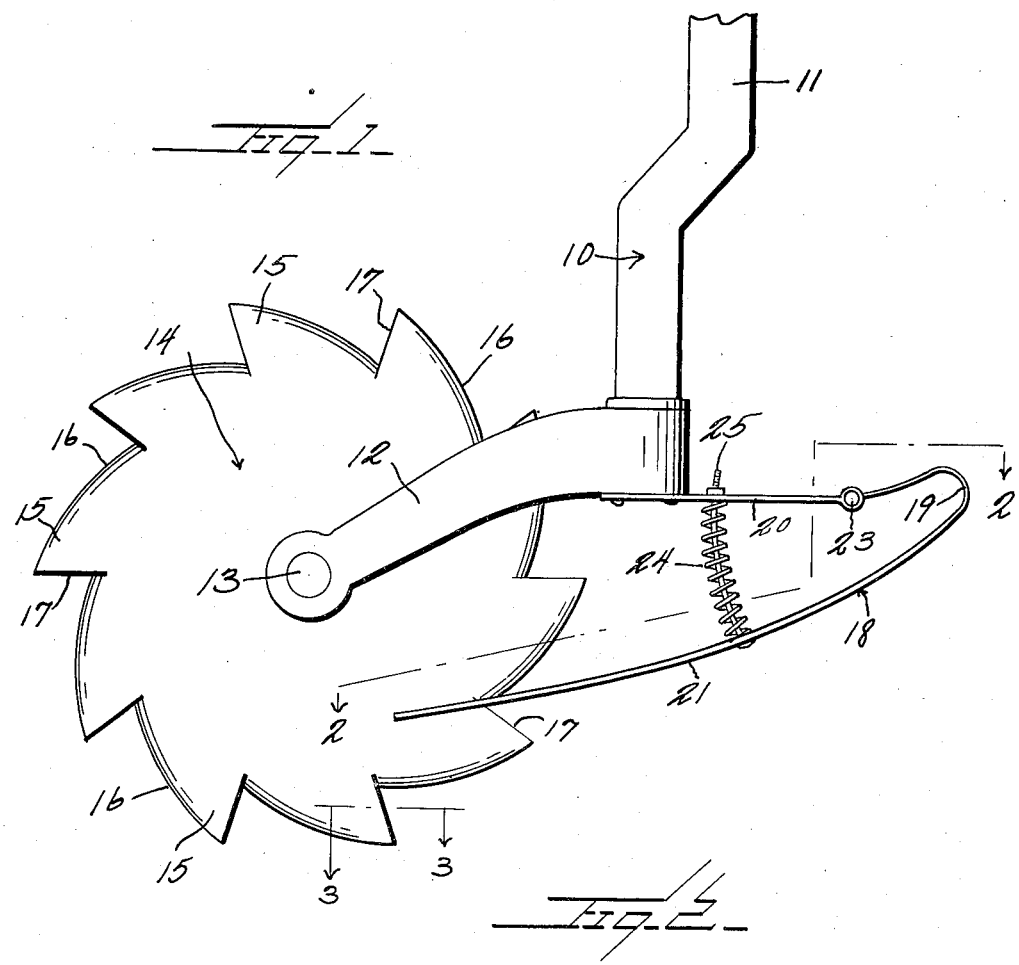
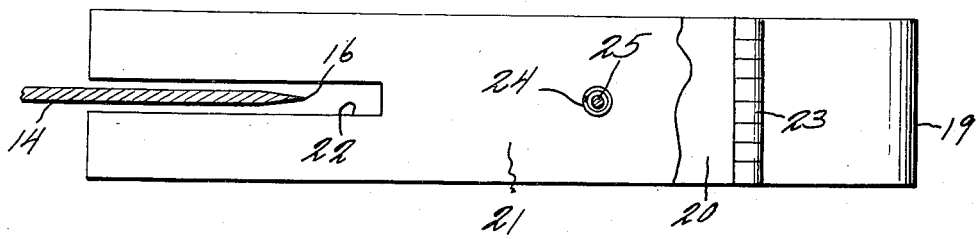
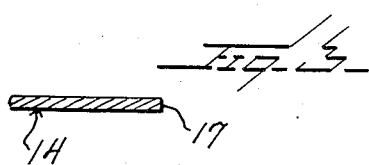
Inventor
A.E.Lindelof
By Watson E. Coleman
Attorney Patented June 6, 1939

2,161,714

UNITED STATES PATENT OFFICE 2,161,714

PLOW COLTER AND SHOE

August E. Lindelof, Tampico, Ill.

Application June 4, 1938, Serial No. 211,907

1 Claim. (Cl. 97—209)

This invention relates to colters such as are used with plows, cultivators and other like agricultural implements and particularly to a wheel colter having a sharp edge. Colters of this character tend to clog and slide when the colter runs into straw, weeds or trash of any kind. This causes much inconvenience, particularly when the implement is drawn by a tractor, as the operator has to stop and get off the tractor in order to clear the trash away.

The general object of my invention is to overcome this by providing a colter, the edge of which is formed with teeth in the general form of ratchet teeth, the outer edge of each ratchet tooth being sharp while the end of each ratchet tooth is blunt so that this blunt edge will, relatively speaking, push against the trash and ground, which helps to get the colter turning instead of sliding and clogging.

A further object is to provide means in connection with a colter of the character described, which is in the form of a shoe disposed in advance of the colter and which presses all the trash downward in front of the colter so that it will be cut instead of being pushed.

My invention is illustrated in the accompanying drawing wherein:

Fig. 1 is a side elevation of a colter for agricultural machines constructed in accordance with my invention.

Fig. 2 is a section on the line 2—2 of Fig. 1.

Fig. 3 is a section on the line 3—3 of Fig. 1.

Referring to the drawing, 10 designates the shank for supporting the colter on a plow. This shank extends downward for a certain distance, then is deflected at 11, then extends straight downward and at its lower end is provided with a two-armed yoke 12 which extends downward and rearward from the shank 10. Mounted upon a shaft or trunnion 13 is the colter 14. As before stated, this colter is formed with what may be termed ratchet teeth upon its edge. Each tooth 15 is formed with an outwardly and forwardly curved cutting edge 16 which is sharpened so as to cut through the trash, straw or the like. The outer end of each tooth 15 terminates in a radially extending end face 17 which is blunt. As the implement is drawn forward, the colter, which is disposed in advance of the plow or other cultivating tool, is rotated in the direction of the arrow.

Disposed in front of the colter is a shoe designated generally 18, this shoe in the embodiment illustrated being formed of a strip of metal approximately 4" wide and ¼" thick. This strip is bent at its forward end 19 so as to form an upper arm 20 and a lower downwardly and rearwardly curved arm 21. The upper arm 20 is secured to the lower end of the shank 10 in any suitable manner while the downward and rearwardly extending arm is formed with a longitudinally extending slot 22 in which the colter operates. The strip 18 may be formed with a hinge 23 just rearward of the forward end 19 of the shoe. In any event, a hinge of some character is formed at the point 23 and disposed between the portion 20 and the portion 21 is a spring 24 which surrounds a bolt 25. This spring acts to force the lower arm 21 of the shoe downward but permits trash or other material to force the lower arm upward. The upward and forward curve of the lower arm 21 permits the shoe to ride easily over trash such as straw, leaves or the like, and force this material downward into the path of the colter. Inasmuch as the blunt ends of the ratchet-like blades engage with the trash or with the ground, the forward movement of the tractor will cause the positive rotation of the colter while the sharp curved edges 16 will give a slicing cut to the material over which the colter is being drawn. Thus the colter will cut instead of push trash in front of it or ride over the trash.

I do not wish to be limited to any particular agricultural implement to which this structure can be applied nor to the details of construction as these might be varied in many ways without departing from the spirit of the invention as defined in the appended claim.

What is claimed is:—

In a colter having a sharpened cutting edge and supporting means for the colter, an arm secured at one end to the supporting means and extending forwardly of the colter, a second arm having a short reversely bent end portion, pivotal coupling means between the end of said end portion and the forward end of said first arm whereby the second arm may have vertical movement, said second arm being in the form of a relatively wide strip of material and extending downwardly and rearwardly and having formed in its rear end a slot in which the edge of said colter positions, and resilient means interposed between the arms and normally urging the second arm downwardly.

AUGUST E. LINDELOF.